United States Patent [19]

Kunst et al.

[11] Patent Number: 5,177,036
[45] Date of Patent: Jan. 5, 1993

[54] CERAMIC MATERIAL

[76] Inventors: Franz D. Kunst, 41 Toseland Drive, Roseland Park Estate,, Paignton Devon, United Kingdom, TQ4 7DS; Arthur F. Payne, Two Hoots, White Hill Close, Exeter Road,, Newton Abbot, Devon, United Kingdom, T12 6QY; Paul A. Wilkinson, 20 College Street,, East Bridgeford, Nottinghamshire, United Kingdom, NG13 8LF

[21] Appl. No.: 623,988

[22] PCT Filed: Jun. 26, 1989

[86] PCT No.: PCT/GB89/00711
§ 371 Date: Feb. 20, 1991
§ 102(e) Date: Feb. 20, 1991

[87] PCT Pub. No.: WO89/12608
PCT Pub. Date: Dec. 28, 1989

[30] Foreign Application Priority Data

Jun. 24, 1988 [GB] United Kingdom ............... 8815123
Sep. 19, 1988 [GB] United Kingdom ............... 8821906

[51] Int. Cl.⁵ .............................................. C04B 38/02
[52] U.S. Cl. ..................................... 501/84; 119/171; 502/80
[58] Field of Search ................... 119/171; 502/80, 62; 501/141, 144, 145, 148, 150, 81, 84

[56] References Cited

U.S. PATENT DOCUMENTS

| 491,764 | 2/1883 | Butler | 501/150 |
| 4,159,008 | 6/1979 | Bavaueas | 119/1 |
| 4,187,803 | 2/1980 | Valenta | 119/1 |
| 4,275,684 | 6/1981 | Krämer et al. | 119/1 |
| 4,671,208 | 6/1982 | Smith | 119/1 |
| 4,824,810 | 4/1989 | Lang et al. | 501/84 |

FOREIGN PATENT DOCUMENTS

| 2227894 | 12/1973 | Fed. Rep. of Germany . |
| 3503803 | 8/1986 | Fed. Rep. of Germany . |
| 0477972 | 11/1975 | U.S.S.R. . |
| 1437186 | 5/1976 | United Kingdom . |

OTHER PUBLICATIONS

Sprechsaal, vol. 103 #19 Oct. 10, 1970 H. Schmidit.

*Primary Examiner*—Mark L. Bell
*Assistant Examiner*—Alan Wright
*Attorney, Agent, or Firm*—Curtis, Morris & Safford

[57] ABSTRACT

A porous granular ceramic material has a granule size of from 1 to 5 mm, a bulk density of from 200 to 700 g/l, preferably 350 to 550 g/l, a porosity of from 50 to 80% v/v, preferably from 65 to 80% v/v, and a liquid absorbency of from 20 to 200%, preferably from 40 to 150%, of water based on the weight of the granular material. The material may be made by calcining a mixture of a clay and a particulate combustible material. The material is suitable for use as animal litter or as an industrial absorbent for liquids.

12 Claims, No Drawings

CERAMIC MATERIAL

The present invention relates to porous ceramic materials and to methods for their production. In particular, the present invention provides a porous ceramic material having absorbent properties which, at least when in a granular form, make it suitable for such end uses as animal litter or industrial absorbent for liquids.

The present invention provides a porous granular ceramic material having a granule size predominantly within the range of from 1 to 5 mm, a bulk density within the range of from 200 to 700 g/l, a porosity within the range of from 55 to 80% v/v, and a liquid absorbency within the range of from 20 to 200% of water based on the weight of granular material. The material preferably has a bulk density within the range of from 350 to 700 g/l, and a liquid absorbency within the range of from 40 to 150%, more preferably 70% to 150%, of water based on the weight of granular material. More preferably, the material has a bulk density of from 350 to 550 g/l, and a porosity of from 65 to 80% v/v.

In one aspect of the invention, in such a porous granular ceramic material the pores are constituted by voids derived from the combustion of a combustible material previously contained therein. The said combustible material is advantageously lignite. The ceramic material is preferably a clay-based material.

The present invention further provides a method for the preparation of a porous ceramic material comprising calcining a mixture of clay and a particulate combustible material, the temperature and time of calcination being such that a substantial amount of the clay minerals remain unvitrified and at least a part of the combustible material is burned off. Preferably, when the product is to be used as an animal litter, substantially all the combustible material is burnt off.

The temperature of calcination is preferably in the range from 800° C. to 1100° C., more preferably from 1000° C. to 1100° C.

As examples of clays suitable for use in the invention there may be mentioned ball clay, especially carbonaceous clay.

When the porous material of the invention is produced from a mixture of clay and lignite the ratio of clay:lignite is preferably within the range of from 1:9 to 9:1, more preferably from 1:2 to 2:1.

The mixture of clay and a combustible material may be obtained by mixing particulate or powdered clay and combustible material with sufficient water to cause the particles to form agglomerates, and drying the agglomerated mixture.

If desired or required, a surfactant or deflocculating agent may be employed to assist in forming a satisfactory mixture.

The aqueous material is preferably dried to a moisture content of not more than 5%, wet basis. The mixture is preferably dried at a temperature of not greater than 200° C. Advantageously, the conditions of the calcination step are such that the weight loss of the mixture is from 40 to 65%, preferably 40 to 55%, based on the weight of the dried mixture.

In a preferred process according to the invention the moist mixture is shaped prior to drying and, if necessary, the dried mixture is divided into granules. The mixture may, for example, be shaped by extrusion, for example using a pug mill or brick extruder, and the extrudate dried, broken and screened to recover granules within the desired size range. Any material screened out may be recycled for use so that the process produces very little waste.

In a particularly advantageous manner of operation the mixture is extruded onto a flat surface so that the granules have at least one flat surface. This allows more efficient packing of the granules in a bed and, when used as animal litter, the improved packing reduces liquid penetration through the bed.

Alternatively, the moist mixture may be formed directly into granules. Granulation may occur in the mixer or the mixture may be subjected to pelletisation for example on a drum or pan pelletiser.

Preferably, the particle sizes of the clay and of the combustible material in the starting mixture are each not greater than 2 mm.

Some carbonaceous clays are associated geologically with lignite and such clays may contain sufficient lignite to be used in their raw state in the method of the invention without the addition of further combustible matter. In that case such a clay may be used alone in place of the combination of clay and combustible material.

Preferably, when the product is to be used as animal litter, substantially all the combustible material is burned off during calcination. With many clays, e.g., carbonaceous clays, this enables a white product to be obtained.

Thus, in accordance with a preferred embodiment of the invention the porous, granular ceramic product is made by forming a moist mixture comprising clay and lignite, shaping, drying and subdividing the mixture to form granules, and calcining the granules to burn out the lignite.

The product usually has a substantially neutral pH and is usually strong enough to resist attrition and dust formation in use. The material has an open-pore structure, the matrix of which is permeable. That is, the material contains a network of relatively large pores that are interconnected by relatively small pores.

The properties of the product depend upon a variety of factors, which may be adjusted in order to obtain a product of particular desired characteristics. These factors include, for example: the type of clay employed, which affects the colour and strength of the product; the particle sizes of the clay and combustible material, which determine the pore size and the absorption properties; the ratio of clay to combustible material, which controls the density and hence the porosity and strength; the drying time and temperature, which may affect the particle shape and also the strength; and the kiln environment (that is, the temperature, firing profile and atmosphere), which can affect the colour, density, strength and absorption properties. For example, an increased strength may be obtained in a material according to the invention by using a higher drying temperature or a higher kiln temperature.

Where an extrusion procedure is employed, the type of extruder will affect the strength and particle shape of the final product. The type of comminuting or crushing device used to break the material after shaping and drying will also affect the particle shape and size distribution of the product.

The following examples illustrate the invention:

EXAMPLE 1

50 kg of milled clay (moisture content 28% wet basis), 90 kg milled lignite (moisture content 31.8% wet basis) and 14.7 liters of water are placed in an Eirich mixer and mixed for 5 minutes. The resulting moist granular mixture is fed into a pug mill or brick extruder, which compresses the mixture and extrudes it in the form of a continuous rod or rods. The rods are passed through a drier at 100° C. until the moisture content is reduced to not more than 5% wet basis. This hardens the rods so that they may be crushed and sieved to recover granules of a size range of 1–5 mm. The selected granules are finally calcined by passage through a rotary kiln at 1050° C. until substantially all the lignite is burned off.

The product of this process is a porous granular ceramic material of irregular shape, with a granule size within the range of from 1 to 5 mm. A bulk product density of 460 g/l is achieved by this process. The product is of substantially neutral pH and is capable of absorbing 77% of its own weight of water or urine. The porosity of the product is within the range of from 55 to 80% v/v. The product has high intrinsic strength and is very resistant to attrition and dust formation, both dry and in use. The properties of the material reduce the amount of scattering of material by animals when used as litter. Discoloration of the product in use is minimal.

(The bulk density of the product is calculated by determining the weight of a given volume (not less than 500 cm$^3$) of material treated in accordance with B.S.1460 but using manual tapping. The liquid absorption is determined by covering the material with liquid, mixing, and leaving to stand for 5 minutes, the residual liquid then being removed. The absorption in % is calculated from the material weight ($W_m$) and liquid weight absorbed ($W_l$) according to the equation: $(W_l \times 100)/W_m$. The porosity is determined using the same method, except that the porosity is calculated from the material volume $V_m$ and the volume of liquid absorbed $V_l$ according to the equation: $(V_l \times 100)/V_m$. The volume $V_m$ is the volume of the material per se, that is, excluding the volume between particles. The pH of the material is determined by dispersing particles of the material of size less than 190! in deionised water and after mixing allowing to stand for at least 12 hours, the sample then being stirred for one minute prior to measuring the pH of the solution.)

EXAMPLE 2

50 kg of carbonaceous clay (moisture content 28% wet basis) and 90 kg of lignite (moisture content 31.8% wet basis) are milled separately to a particle size of below 2 mm and then placed in an Eirich mixer with 14.7 liters of water and mixed for 2 minutes. A mixture containing discrete granules is obtained. The granules are dried directly at 150° C. for 20 minutes. Fines and oversize material are recycled to the mixing stage. The remainder is fired at 1070° C. for 20 minutes in an excess of oxygen.

The product obtained has all the properties of that of Example 1, except that the strength is marginally less. This process avoids the use of extruder machinery and is therefore cheaper to operate. Furthermore, water or urine absorption of the product may in some cases be greater than that of an extruded material made from a mixture of the same composition.

EXAMPLE 3

50 kg of milled carbonaceous clay (moisture content 28% wet basis), 90 kg of milled lignite (moisture content 31.8% wet basis), and 14.7 liters of water are placed in an Eirich mixer and mixed for 5 minutes. The resulting moist granular mixture is extruded in the form of a continuous sheet by a brick extruder or a twin roller extruder onto the belt of a continuous dryer. The sheet is passed through the dryer at 150° C. until the moisture content is not more than 5% wet basis. The embrittled sheet is further broken by a roller crusher and after sieving granules of a size range of 1–5 mm are recovered. Fines are recycled to the mixing stage and oversize material is recycled to the crusher. The remainder is calcined by passing through a rotary kiln at 1050° C. until substantially all the lignite is burned off.

The product has similar properties to that of Example 1 except that the granules now have at least one flat surface. This allows the formation of an improved packed bed and, when used as animal litter, reduces liquid penetration through the bed.

EXAMPLE 4

50 kg of clay, 30 kg of lignite and 10 liters of water are placed in a mixer and mixed for 15 minutes. The resulting moist granular mass is fed into a brick extruder, which compresses the granules and extrudes them in the form of a continuous rod or rods. The rods are passed through a drier at 100° C. This hardens the rods so that they may be crushed and sieved to recover a particles in the size range 1 to 5 mm. The selected particles are finally calcined by passage through a rotary kiln at 1050° C.

The product of this process is a granular ceramic material of irregular shape, porous appearance, and a particle size within the range 1 to 5 mm. Bulk product densities of 250 to 650 g/l may be achieved by this process, but are preferably between 350 and 500 g/l. The product is of neutral pH and may absorb 70 to 200%, preferably 100 to 150%, of its own weight of water or urine. The product has high intrinsic strength and is very resistant towards attrition and dust formation, both dry and in use. The material is therefore not scattered or trodden about by animals when used as litter. Discoloration of the product in use is minimal.

EXAMPLE 5

50 kg of carbonaceous clay and 30 kg lignite are milled to below 2 mm and then placed in a mixer with 10 liters of water. After 15 minutes mixing, discrete granules are formed which can be dried directly at 150° C. for 10 minutes. Fines and oversize material are recycled to the mixing stage. The remainder is fired at 1070° C. for 10 minutes in an excess of oxygen.

The product obtained has all the qualities of that of Example 4, except that the strength is marginally reduced. This process avoids the use of extruder machinery and is therefore cheaper to operate. Furthermore, the liquid absorption capability of the product is greater than that of an extruded material, being between 100 and 300% weight for weight, and more usually 150 to 250%. The use of carbonaceous clay gives a white fired product.

EXAMPLE 6

50 kg of carbonaceous clay is dispersed in 20 liters of water with the aid of 100 g sodium silicate as deflocculant. 35 kg lignite is separately dispersed in 20 liters of water with mixing. The two components are then mixed together for 15 minutes and the resultant mass extruded in sheet form onto the belt of a continuous drier. Drying at 105° C. for 15 minutes embrittles the sheet, causing it to fracture under its own weight. The broken pieces are conveyed onto a vibratory screen which collects material 1-5 mm in size, rejects fines, and recycles oversize material. The 1-5 mm fraction is fired at 1100° C. for 2 minutes in a toroidal bed kiln.

The product has similar properties to that of Example 4 except that the granules now have one flat surface. This enables them to form a better packed bed and, when in use as animal litter, reduces liquid penetration through the bed.

What we claim is:

1. A method for the preparation of porous granular ceramic material having a granule size predominantly within the range of from 1 to 5 mm, a bulk density within the range of from 200 to 700 g/l, a porosity within the range of from 55 to 80% v/v, and a liquid absorbency within the range of from 20 to 200% of water based on the weight of granular material, the pores in said porous material being constituted by voids derived from the combustion of lignite previously contained therein, said method comprising calcining granules comprising a mixture of particulate clay and particulate lignite in a weight ratio of 1:2 to 2:1, the temperature and time of calcination being such that a substantial amount of the clay remains unvitrified and the lignite is substantially completely burnt off and the weight loss of the mixture is between 40 and 65% based on the weight of the dried mixture.

2. A method according to claim 1, wherein the calcination temperature is from 800° C. to 1100° C.

3. A method according to claim 1, wherein the mixture of clay and lignite is obtained by mixing clay, the lignite and water to obtain a moist agglomerable mixture and drying agglomerates formed from the mixture.

4. A method as claimed in claim 3, wherein the mixture is dried to a moisture content of not more than 5%.

5. A method according to claim 3, wherein the aqueous mixture is dried at a temperature not exceeding 200° C.

6. A method according to claim 1, wherein the mixture is shaped prior to drying and the dried mixture is divided into granules.

7. A method according to claim 6, in which the mixture is shaped by extrusion, and the extrudate is dried, broken and screened to recover granules within a preselected size range.

8. A method according to claim 7, in which the mixture is extruded onto a flat surface.

9. A method according to claim 1, in which clay, lignite and water are mixed together, the amount of water being such that the mixture so obtained is in the form of discrete granules, which are dried and screened prior to calcination.

10. A method according to claim 1, in which the particle sizes of clay and the lignite in the starting mixture are each not greater than 2 mm.

11. A method according to claim 1, in which granules within the size range of 1 to 5 mm are calcined.

12. A method for the production of animal litter comprising the steps of:
a) forming granules having a granule size predominately within the range of from 1 to 5 mm and comprising an intimate mixture of particulate clay and particulate lignite in a weight ratio of from 1:2 to 2:1, said clay and lignite particles having a particle size of not greater than 2 mm and said granules having a moisture content of not more than 5%;
b) calcining said granules at a temperature of from 80° C. to 1100° C. for a period of time such that i) the weight loss from the granules is from 40 to 65% by weight, ii) the lignite is substantially burnt out of the granules and iii) the clay minerals remain substantially unvitrified; and
c) recovering porous granular ceramic material having a granule size predominantly within the range of from 1 to 5 mm, a bulk density within the range of from 200 to 700 g/l, a porosity within the range of from 55 to 80% v/v, and a liquid absorbency within the range of from 20 to 200% of water based on the weight of granular material, the pores in said porous material being constituted by voids derived from the combustion of the lignite.

* * * * *